Jan. 3, 1933.   A. G. McGRATH   1,892,845
REMOVABLE WHEEL CASTER
Filed March 5, 1932
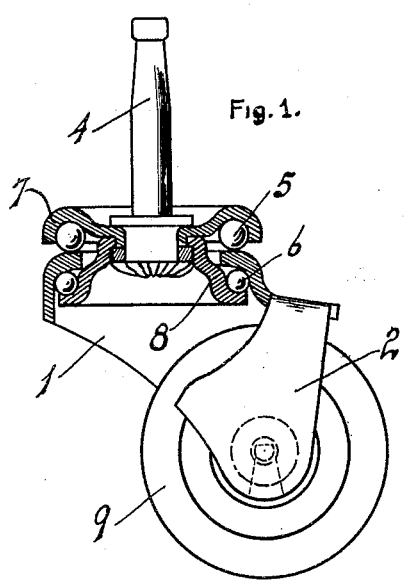
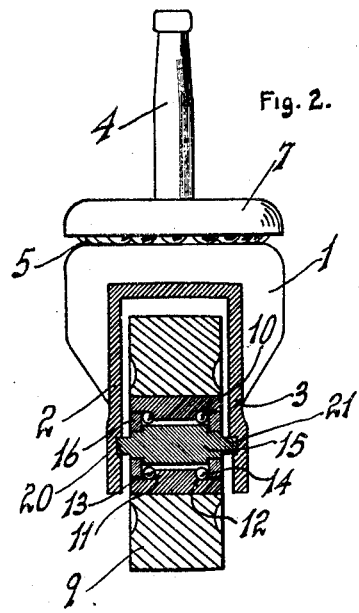
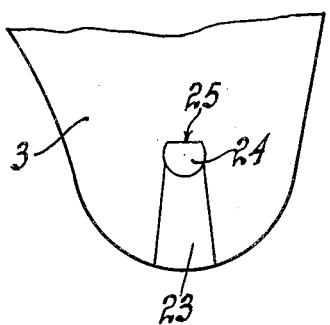
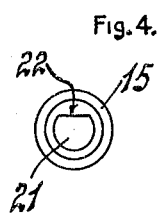
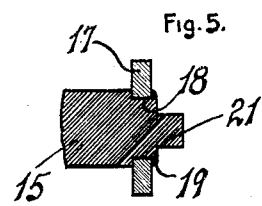
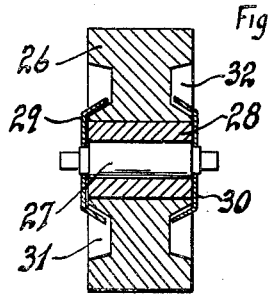
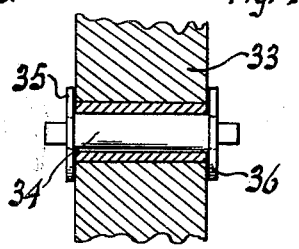
INVENTOR
ALLEN G. McGRATH.
BY *H. A. Duckman*
ATTORNEY.

Patented Jan. 3, 1933

1,892,845

UNITED STATES PATENT OFFICE

ALLEN G. McGRATH, OF LONG BEACH, CALIFORNIA, ASSIGNOR TO THE DARNELL CORPORATION, LTD., OF LONG BEACH, CALIFORNIA, A CORPORATION OF DELAWARE

REMOVABLE WHEEL CASTER

Application filed March 5, 1932. Serial No. 596,949.

This invention relates to a removable wheel caster of the type used upon furniture, portable equipment and the like.

The prime object of my invention is to provide a caster, the wheel of which can be quickly and easily removed without aid of any tool.

Another object is to provide a caster of the character stated in which the natural spring of the yoke serves to securely hold the wheel axle in position.

Still another object is to provide a novel wheel and axle assembly whereby I obtain a unit structure which will not disassemble when removed from the yoke.

Other objects, advantages and features of invention may appear from the accompanying drawing, the subjoined detailed description and the appended claims.

In the drawing:

Figure 1 is a side elevation of my caster with parts broken away to show internal construction.

Figure 2 is a longitudinal, sectional view of the caster taken through the wheel.

Figure 3 is a fragmentary, side view of one of the wings of the yoke.

Figure 4 is an end view of the axle.

Figure 5 is a fragmentary, longitudinal, sectional view of the axle.

Figure 6 is a transverse, sectional view of a caster wheel showing a modified form of axle mounting.

Figure 7 is a fragmentary, transverse, sectional view of a wheel showing another modified form of axle mounting.

Referring more particularly to the drawing, the numeral 1 indicates the caster yoke and includes a pair of depending wings 2 and 3. The material of which the yoke is made has sufficient spring so that it will always return to its proper shape and position and the purpose of this feature will be subsequently described.

A pin 4 rises from the yoke 1 and is rotatably mounted on superimposed ball bearings 5 and 6. These ball bearings have a cap 7 forming the upper ball race and a bell 8 forming the lower ball race. The cap and the bell are both fixedly attached to the pin 4 and rotate therewith. The pin is thus rotatably mounted on the yoke with the ball bearings 5 and 6 interposed. With certain types of equipment it is necessary that the wheel be quickly and easily removed from the yoke in order that the wheel bearing and axle may be cleaned. Also if the wheel should become damaged, it is necessary to replace it, and with my arrangement this is quickly and easily accomplished.

The wheel 9 is formed of any suitable material and preferably includes a metal hub 10. The hub is formed with shoulders 11, 12 which act as a race for the balls 13, 14 respectively. An axle 15 extends through the hub, and this axle is preferably solid although it may be tubular if desired. To retain the balls 13, 14 in position I provide washers 16, 17 which are pressed on to a shoulder on the axle as shown at 18. The outer edge of this shoulder is then peened over as at 19, thus securely holding the washer in position.

Pins 20 and 21 project from the ends of the axle 15 for the purpose of supporting and securing the wheel in the yoke 2. The upper faces of the pins 20 and 21 are flattened as at 22 for the purpose of non-rotatably holding the axle.

The ears 2, 3 are each provided with an indentation 23 which extends upwardly from the lower edge of the ears. The indentation 23 terminates in a recess 24 which recess exactly fits the pins 20 and 21. The upper portion of the recesses 24 are flattened as at 25 to form a shoulder against which the flat portion 22 rests, thus effectively holding the axle against rotation.

To remove the wheel it is only necessary to pull downwardly and the ears 2, 3 will yield enough to allow the axle to pass downwardly through the indentation 23. The wheel is returned to operative position in the same manner, and the ears 2, 3 will spring inwardly to hold the axle against accidental displacement. The shoulder 25 also serves as an ample bearing to prevent the axle from slipping upwardly when a load is applied to the caster.

In Figures 6 and 7, I have shown a type of axle mounting without anti-friction bearings between the wheel and the axle. The wheel 26 has an axle 27 extending transversely through it, and if desired, a sleeve 28 of suitable material may be pressed into the wheel and bears against the axle. String guards 29 and 30 are secured to the axle 27 and the ends of these guards project inwardly into annular recesses 31 and 32 respectively, said recesses being formed or cut in the wheel.

In Figure 7 the wheel 33 is journaled on the axle 34 and the wheel is held in position on the axle by washers 35 and 36 which are suitably secured to the axle, such as by pressing the washers on the axle or integrally forming them on the axle if desired.

Having described my invention, I claim:

1. A removable wheel caster comprising a yoke, a pin rising from the yoke, a pair of spaced wings depending from the yoke, a wheel, an axle on which the wheel is mounted, each of said wings having a recess formed therein, and an indentation extending to said recess, the ends of said axle being adapted to fit into the recesses whereby the wheel is removably mounted between the wings.

2. A removable wheel caster comprising a yoke, a pin rising from the yoke, a pair of spaced wings depending from the yoke, a wheel, an axle on which the wheel is mounted, each of said wings having a recess formed therein, and an indentation extending to said recess, the ends of said axle being adapted to fit into the recesses whereby the wheel is removably mounted between the wings, and anti-friction bearing means between said axle and said wheel.

3. A removable wheel caster comprising a yoke, a pair of wings depending from the yoke, a wheel mounted between the wings, an axle extending through the wheel, a pin projecting from each end of the axle, a flat face on each pin, each of said wings having a recess formed therein to receive said pin whereby the wheel is removably mounted on the wings, and a shoulder in said recess against which the flat surface bears to non-rotatably hold the wheel.

4. A removable wheel caster comprising a yoke, a pair of wings depending from the yoke, a wheel mounted between the wings, an axle extending through the wheel, a pin projecting from each end of the axle, a flat face on each pin, each of said wings having a recess formed therein to receive said pin whereby the wheel is removably mounted on the wings, and anti-friction bearing means between the axle and the wheel.

5. A removable wheel caster comprising a yoke, a pair of wings depending from the yoke, a wheel mounted between the wings, an axle extending through the wheel, a pin projecting from each end of the axle, a flat face on each pin, each of said wings having a recess formed therein to receive said pin whereby the wheel is removably mounted on the wings, and a shoulder in said recess against which the flat surface bears to non-rotatably hold the wheel, and anti-friction bearing means between the axle and the wheel.

In testimony whereof, I affix my signature.

ALLEN G. McGRATH.